United States Patent [19]

Haws

[11] Patent Number: 5,169,737
[45] Date of Patent: Dec. 8, 1992

[54] DEPOSITION PROCESSES

[75] Inventor: Stephen A. Haws, Rickmansworth, Great Britain

[73] Assignee: The General Electric Company, p.l.c., England

[21] Appl. No.: 426,736

[22] Filed: Oct. 24, 1989

[30] Foreign Application Priority Data

Nov. 4, 1988 [GB] United Kingdom ............... 8825826

[51] Int. Cl.$^5$ ............................ G03C 5/00; G03F 9/00
[52] U.S. Cl. ............................................ 430/7; 430/4; 430/20; 430/321
[58] Field of Search ..................... 430/4, 7, 20, 321

[56] References Cited

U.S. PATENT DOCUMENTS

| 4,812,387 | 3/1989 | Suzuki et al. | 430/321 |
| 4,873,175 | 10/1989 | Suzuki et al. | 430/311 |
| 4,948,706 | 8/1990 | Sugihara et al. | 430/20 |

FOREIGN PATENT DOCUMENTS

| 0001138 | 3/1979 | European Pat. Off. |
| 1377727 | 12/1974 | United Kingdom |
| 1453253 | 10/1976 | United Kingdom |
| 1537634 | 1/1979 | United Kingdom |
| 2099212 | 12/1982 | United Kingdom |

OTHER PUBLICATIONS

Patent Abstracts of Japan, vol. 11, No. 178, p. 584, Jun. 9, 1987, 62-9301.
Patent Abstracts of Japan, vol. 11, No. 186, p. 586 Jun. 16, 1989, JP 62-14103.
Patent Abstracts of Japan, vol. 12, No. 427, p. 784, Nov. 11, 1988, JP 63-159808.
SID International Symposium, New Orleans, La., pp. 379-382, W. J. Lathan et al, "A new class of color filters for liquid crystal displays", May 14, 1987.

Primary Examiner—Charles L. Bowers, Jr.
Assistant Examiner—Thorl Chea
Attorney, Agent, or Firm—Kirschstein, Ottinger, Israel & Schiffmiller

[57] ABSTRACT

In a process for depositing a planarising material in spaces between a pattern of regions, such as dye stripes or dots, on a substrate, the planarising material is deposited as a layer over the pattern. The substrate is irradiated, from the reverse side, by a source of radiation, such as UV, to which the pattern material is opaque and to which the planarising material is responsive such that it is rendered insoluble to a particular solvent. The radiation acts on only those parts of the planarising material which are in the spaces. The remainder of the planarising layer is then removed by use of the solvent. Alternatively, or additionally, an ITO or other UV transparent layer may be formed over the pattern and a layer of resist formed thereover. The radiation then passes through the spaces and acts on only the resist areas over the spaces to render them soluble. Those areas and the ITO layer beneath them are then removed by etching, leaving ITO areas accurately aligned with the pattern. The process may be used in the manufacture of LC displays or semiconductor devices.

8 Claims, 2 Drawing Sheets

DEPOSITION PROCESSES

BACKGROUND OF THE INVENTION

1. Field of the Invention

This invention relates to deposition processes, and particularly to processes for depositing on a substrate thin films of materials having areas which are accurately positioned relative to each other.

2. Description of Related Art

In the manufacture of a number of different types of electronic devices, two or more thin films of materials must be deposited on a substrate, for example by vacuum deposition, in such a manner that areas of one of the films are accurately located relative to areas of the other film.

One such device is a flat panel liquid crystal display for a colour television receiver. Such a display comprises two parallel spaced apart transparent plates between which a quantity of liquid crystal material is confined. On the inner surface of one plate are deposited parallel stripes, or alternatively rows and columns of rectangular elemental areas, of red, blue and green dyes, to act as colour filters. Corresponding stripes or areas of transparent electrically-conductive material must be deposited over the dye stripes or areas, and exactly in alignment therewith, to act as electrodes for the liquid crystal cells.

A conventional process for depositing such electrodes comprises depositing a film of the conductive material over the entire display area, depositing a layer of a resist material over the conductive film, masking the resist layer, imaging the resist layer, dissolving away the areas of the resist layer corresponding to the spaces between the dye areas, and etching away the conductive layer corresponding to those spaces.

The remaining areas of the conductive layer must be accurately aligned with the dye stripes or rectangular areas, even though the stripes or areas may be only a few microns wide. This process requires extremely accurate positioning of the mask, which is time-consuming and involves the use of expensive equipment.

In an alternative process, the unwanted portions of the conductive layer between the dye stripes or areas are eroded by means of a laser beam. Again, this requires the use of very accurate and expensive positioning equipment.

SUMMARY OF THE INVENTION

It is an object of the present invention to provide a simplified process for forming accurately-positioned areas, such as the above-mentioned areas of dye and conductive material, on a transparent substrate.

According to one aspect of the invention there is provided a process of forming on a front face of a substrate spaced-apart first regions of the same or different colour filtering materials and spaced-apart second regions of another material, accurately positioned relative to said first regions, the process comprising the steps of forming said first regions on the substrate; depositing a layer of said other material over said first regions and over the spaces therebetween; irradiating the reverse face of the substrate with radiation to which the substrate and said other material are substantially transparent and to which the material of each of said first regions is substantially opaque, whereby the radiation passes through the substrate and impinges on only those regions of said second material within said spaces thereby rendering those regions of said second material insoluble to a solvent to which the unirradiated second material is soluble; and using said solvent to remove the second material other than in said spaces.

Preferably said first and second regions together form a substantially planarised layer.

According to another aspect of the invention there is provided a process for forming on a front face of a substrate spaced-apart first regions of the same or different colour filtering materials and spaced-apart second regions of another material, accurately positioned relative to said first regions, the process comprising the steps of forming said first regions on the substrate; depositing a layer of said other material over said first regions and over the spaces therebetween; depositing a layer of resist material over said second layer; irradiating the reverse face of the substrate with radiation to which the substrate and said other material are substantially transparent and to which the material of each of said first regions is substantially opaque, whereby the radiation passes through the substrate and thence through the spaces between said first regions and impinges on the resist layer only at areas over said spaces thereby rendering those resist layer areas soluble; and dissolving away those resist layer areas and removing corresponding areas of said other material thereunder.

Said first regions may be formed of dye materials and said other material may be a transparent electrically-conductive material. The radiation is preferably ultraviolet light.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1A:
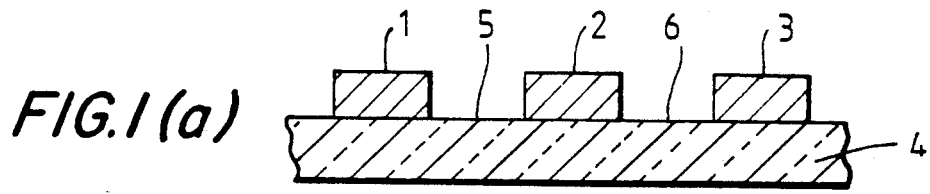
FIGS. 1(b)–1(e) are schematic cross-sectional views showing various stages in a first deposition process in accordance with the invention.

Referring to FIG. 1(a), stripes 1, 2 and 3, or rows and columns of elemental areas, of red, green and blue dye materials are firstly deposited on a glass or other transparent substrate 4 by conventional masking and deposition techniques, leaving spaces, such as the spaces 5 and 6, therebetween. The substrate is to form one plate of a liquid crystal display panel. The dye materials may be, for example, dyed polyimide, dyed photoresist materials or gelatin-based materials. Electrodeposited materials may be used.

Figure 1B:
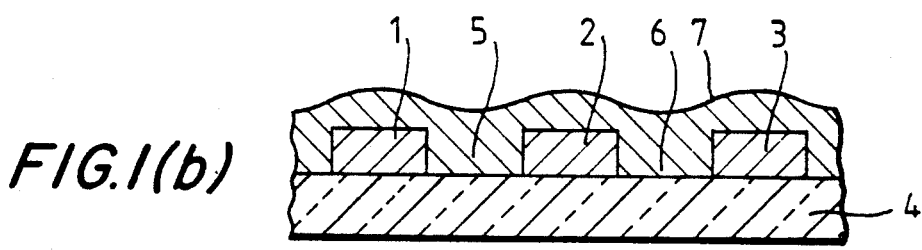

A layer 7 (FIG. 1(b)) of a negative photosensitive material, such as photosensitive polyimide, is then deposited over the stripes 1,2 and 3. This layer will have undulations, as shown, where it rises over the stripes and falls into the spaces.

Figure 1C:
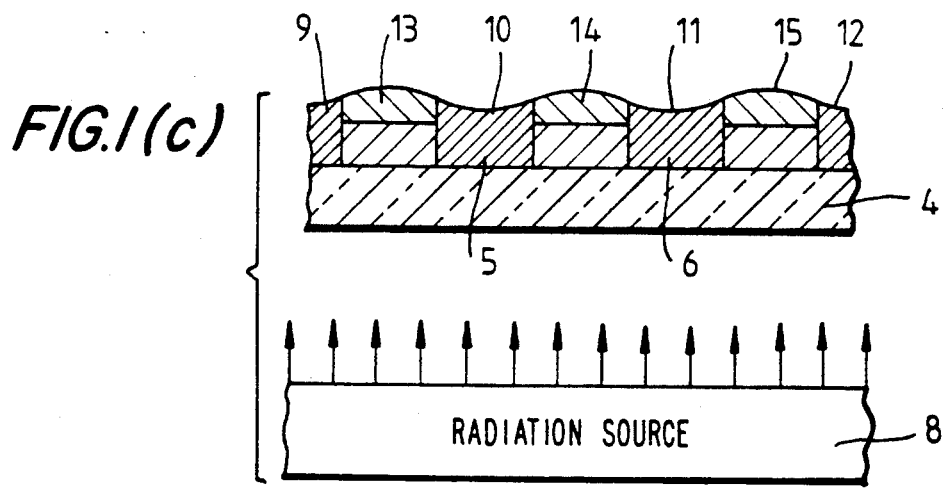

Referring to FIG. 1(c), a radiation source 8 is then used to irradiate the substrate from its reverse side. The type of radiation is selected so that the materials of the substrate and the photosensitve layer are substantially transparent to it, but the dye areas are substantially opaque to it. Furthermore, the radiation must be capable of activating the photosensitive material. For the materials mentioned above, ultraviolet light of 405 nm wavelength is found to be effective. In other applications, radiation of other wavelengths might be used, such as infrared.

The ultraviolet passes through the substrate 4 and through the spaces 5 and 6 and the areas of the layer 7 in and immediately above the spaces, but does not pass through the dye stripes. Polymerised regions 9, 10, 11 and 12 of the polyimide are thereby formed in and over the spaces, but regions 13, 14 and 15 over the dye stripes are unaffected.

Figure 1D:
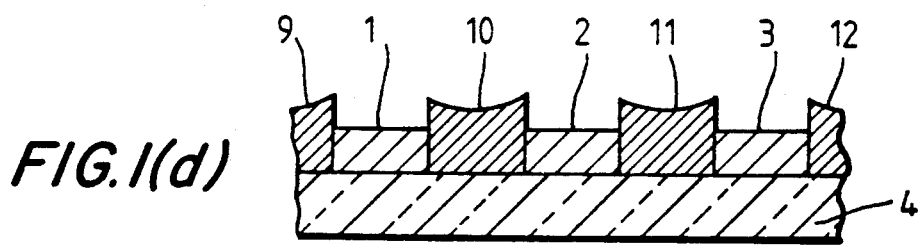

The device is then treated with a solvent which dissolves the unactivated polyimide regions 13, 14 and 15, leaving the regions 9, 10 11 and 12 intact (FIG. 1(d)), but protruding above the dye stripes 1, 2, 3.

Figure 1E:
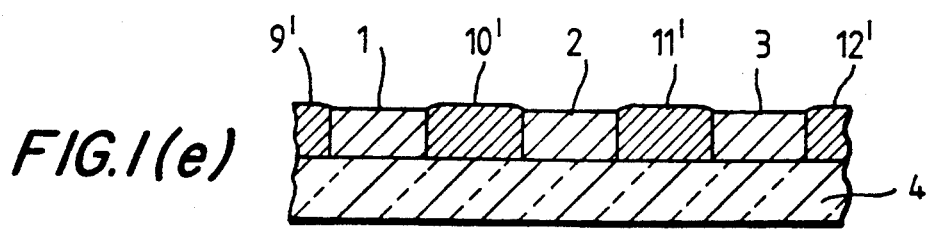

The thickness of the polyimide layer is carefully controlled to give a substantially planarised layer (FIG. 1(e)) after any high temperature baking that is required. A further layer, for example an electrically-conductive layer, may be formed on the substantially planarised layer.

Instead of using polyimide for the layer 7, any other suitable photosensitive material may be used.

FIG. 2 illustrates another process in accordance with the invention. In this case, stripes 16, 17 and 18, or rectangular areas, of dye materials are deposited on a transparent substrate 19 with spaces 20, 21 therebetween, as described above. The dye materials may be any of the dye materials referred to previously. The spaces 20, 21 may be filled with polyimide, as described above, to form a planarised layer, before a layer 22 of a transparent electrically-conductive material, such as indium tin oxide (ITO), is deposited thereover (FIG. 2(b)). Alternatively, the stripes 16, 17, 18 may be planarised by any conventional technique, using a planarising material which is transparent to the ultraviolet light.

Figure 2A:
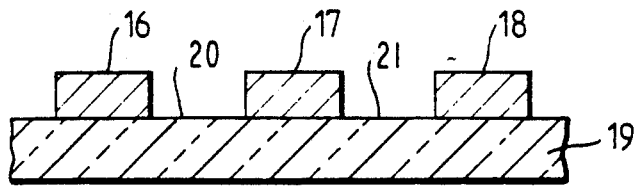
FIGS. 2(a)–2(h) are schematic cross-sectional views showing various stages in a second deposition process in accordance with the invention.
Figure 2B:
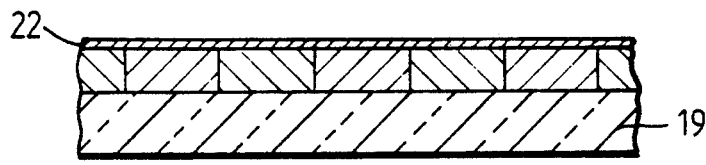
Figure 2C:
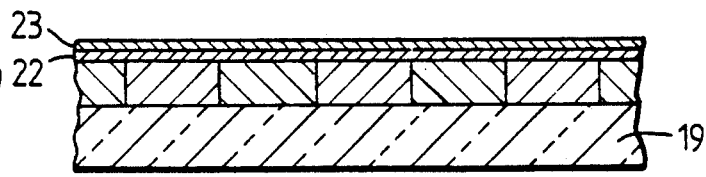
Figure 2D:
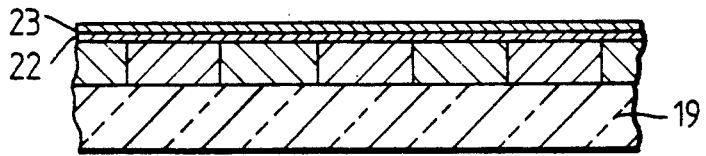
Figure 2E:
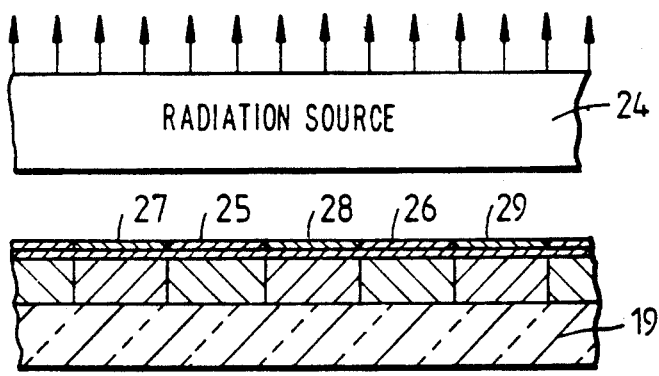
Figure 2F:
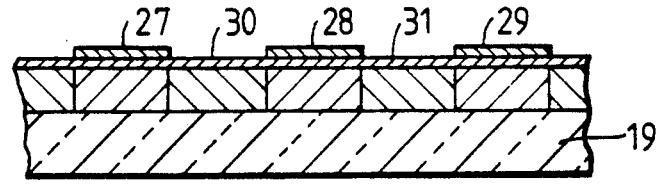
Figure 2G:
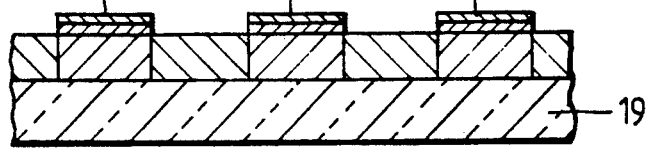

A layer 23 (FIG. 2(c)) of a positive resist material is then deposited over the ITO layer 22. A source 24 of ultraviolet light (FIG. 2(d)) then irradiates the substrate, as described above, so that the UV which activates the resist passes through the substrate and through the polyimide in the spaces 20 and 21, but not through the dye areas 16, 17, 18. It may be necessary to selectively filter the UV irradiating the substrate in order to eliminate wavelengths which would pass through the dye and activate the resist. The UV then passes through the ITO layer 22 and irradiates regions 25, 26 of the resist layer (FIG. 2(e)) immediately above the spaces 20 and 21, but not the regions 27, 28, 29 over the dye stripes 16, 17, 18, respectively. The regions 25 and 26 are thereby rendered soluble, and they are removed by immersing the device in the appropriate solvent. This reveals ITO layer areas 30 and 31 therebeneath (FIG. 2(f)), and these areas are then etched away, using the regions 27, 28, 29 of the resist layer as a mask (FIG. 2(g)).

Figure 2H:
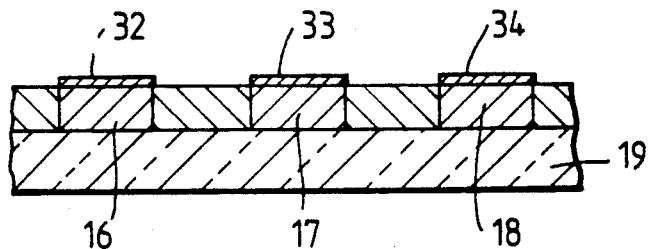

The regions 27, 28 and 29 of the resist layer are then removed, revealing areas 32, 33 and 34 of the ITO layer exactly in alignment with the dye stripes or areas 16, 17 and 18, respectively (FIG. 2(h)).

It will be apparent that the areas 32, 33 and 34 have been formed without the need for any complicated and expensive masking and positioning procedure.

In the above embodiment, the step of filling the spaces 20 and 21 with polyimide could alternatively be omitted. The ITO layer would then be deposited over the dye stripes and down into the spaces 20 and 21. The rest of the process would then be carried out, in the same manner as described above, to produce the aligned ITO and dye regions.

It will be seen that the process of the present invention could be used to produce aligned sets of regions of other types of materials, provided that the material of one set of regions is substantially transparent to the radiation, and the material of the other set is substantially opaque.

The material which is used to fill the spaces 5 and 6 of FIG. 1 and 20, 21 of FIG. 2 may be coloured as required, for example black, to improve the contrast of the resulting liquid crystal display. The material, must, of course, pass the radiation wavelength which is required to activate the photosensitive material.

I claim:

1. A process for forming a first set of regions of the same or different color filtering materials spaced apart on a front face of a substrate, and a second set of regions of a transparent electrically-conductive material accurately positioned on said first set of regions, the process comprising the steps of:

(a) forming said first set of regions on said front face of the substrate;
   (b) depositing a layer of said electrically-conductive material over said first set of regions and over the spaces therebetween;
   (c) depositing a resist layer of photosensitive resist material over said layer of electrically-conductive material;
   (d) irradiating a reverse face of the substate with radiation to which the substrate and the electrically-conductive material are substantially transparent and to which the color filtering material of each of said first set of regions is substantially opaque, whereby the radiation passes through the substrate and then through the spaces between said first set of regions and impinges on the resist layer only at areas over said spaces, thereby rendering those resist layer areas soluble; and
   (e) dissolving away said soluble resist layer areas and removing corresponding areas of said electrically-conductive material thereunder.

2. A process as claimed in claim 1, wherein said first regions are formed of dye materials.

3. A process as claimed in claim 1, wherein said first regions are formed of dyed polyimide.

4. A process as claimed in claim 1, wherein said first regions are formed of dyed photoresist.

5. A process as claimed in claim 1, wherein said first regions are formed of gelatin-based material.

6. A process as claimed in claim 1, wherein said first regions are formed of electrodeposited material.

7. A process as claimed in claim 1, wherein the radiation is ultraviolet light.

8. A process as claimed in claim 1, wherein said electrically-conductive material is indium tin oxide.

* * * * *